United States Patent [19]

Lachonius et al.

[11] Patent Number: 4,856,643
[45] Date of Patent: Aug. 15, 1989

[54] DEVICE FOR RETAINING TWO PARALLEL TRACKS

[75] Inventors: Leif Lachonius, Surte; Göran Abbestam, Gothenburg, both of Sweden

[73] Assignee: Aktiebolaget SKF, Sweden

[21] Appl. No.: 189,991

[22] Filed: May 4, 1988

[30] Foreign Application Priority Data

May 5, 1987 [SE] Sweden .................... 8701838

[51] Int. Cl.⁴ .......................... B65G 15/14
[52] U.S. Cl. .................... 198/627; 198/861.1
[58] Field of Search .................... 198/627, 817

[56] References Cited

U.S. PATENT DOCUMENTS 1,720,680  7/1929  Kleineberg .................... 198/627
3,858,711  1/1975  Barker .................... 198/627
4,694,953  9/1987  Murphy et al. .................... 198/627

*Primary Examiner*—Joseph E. Valenza
*Attorney, Agent, or Firm*—Eugene E. Renz, Jr.

[57] ABSTRACT

The invention relates to a device for retaining two parallel tracks, such as conveyor tracks, and for adjusting the distance therebetween. The device comprises a supporting beam which extends transversely relative to the parallel tracks. Two mounting units for the tracks are mutually displaceably arranged. The position of the mounting units is settled by means of a common shaft, which is axially fixed and provided with right-handed or left-handed threads, said threads being intended to cooperate with corresponding threads in the mounting units.

1 Claim, 5 Drawing Sheets

DEVICE FOR RETAINING TWO PARALLEL TRACKS

The present invention relates to a device for retaining two parallel tracks such as conveyor tracks, beams or the like, which device, beside the retainment, is particularly suited for adjustment of the distance between these parallel tracks or beams.

BACKGROUND OF THE INVENTION

There are various cases when conveyor tracks or beams or similar devices are suspended in pairs and wherein the two components of the pairs shall be parallel and be able to be adjusted often as to the mutual distance from each other. Such a case is, e.g. conveyor tracks in the industry where objects shall be conveyed upwards or downwards in a manufacturing process or the like, retained between two parallel tracks. For example, in the packaging industry, cans, bottles or the like are conveyed from one level to another before they finally leave the packaging procedure.

In the above case, it is common that the objects are conveyed in a forward direction on an endless track and at the end thereof are seized by two parallel, endless tracks for transport upwards or downwards. It is then important that the two ascending or descending tracks retain the objects with an adequate grip. This means that the distance between these tracks must be accurately adjusted. Sometimes the size of the objects, which shall be seized by these tracks is altered and is then necessary to alter the space between the tracks.

The parallel tracks are generally attached on beams by means of different members which can be fitted by screws. If now the space between these two tracks is altered, it is thus necessary to unscrew some attachment members, displace one or both tracks transversely and then to fix them again with the screws. This is time-wasting work for a trained operator, and it requires precision to obtain a satisfactory result. Sometimes the tracks are rather long and several suspension points are required for them, which means that the adjustments have to be done in a plurality of positions. It, therefore, since long has been a desire to be able to adjust the distance between said conveyor tracks in a simple and accurate manner, thus that no appreciable stoppage is caused when changing from one size to another for the objects that shall be seized and conveyed by the tracks.

SUMMARY OF THE INVENTION

This problem has been solved according to the present invention and the objectives cited above are met by a device in accordance with the present invention which incorporates a supporting beam arranged transversely to the parallel tracks. The beam is arranged between two mounting units for the tracks which are displaceable relative to each other, whereby the positions of the units are decided by means of a common, axially arrested, rotatable shaft provided with right-handed and left-handed threads, respectively, which are intended to cooperate with corresponding threads in the mounting units.

According to the invention it is suitable that the mounting units are equipped with bushings and run on guides attached to each side of the transverse beam.

According to the invention, it is furthermore appropriate that each mounting unit is provided with a nut with internal threads for cooperation with the threads of the shaft fitted therein.

The common shaft that extends through both mounting units is preferably driven via a work gear or an angular gear.

A further feature of the invention is that several shafts are interconnected and can be driven synchronous from the same drive source.

BRIEF DESCRIPTION OF THE DRAWINGS

These and other objects of the present invention and the various features amd details of the operation and construction thereof are hereinafter more fully set forth with reference to the accompanying drawings, wherein.

DESCRIPTION OF THE PREFERRED EMBODIMENT

Figure 1:
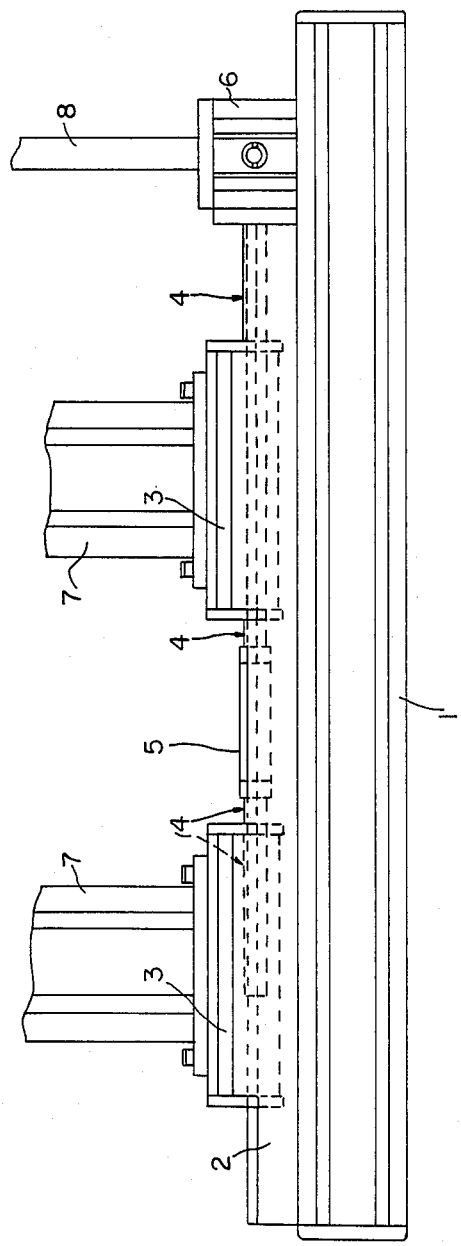
FIG. 1 shows a device according to the invention as seen from the side.

In FIG. 1 is shown a device according to the invention, incorporating a support beam 1. On this support beam 1 a guide 2 is screwed, or fitted in another manner on each side of the support beam 1. Two mounting units 3 are displaceably arranged relative to each other upon these guides 2, which in turn are interconnected on the support beam 1.

A shaft 4 extends through the mounting units 3. This shaft 4 consists of two units, which are connected by means of a sleeve 5. The shaft 4 is over a large range threaded from the connecting sleeve 5 and into the mounting units 3, on one side with left-handed threads $T_L$ and on the other side with right-handed threads $T_R$. These threads cooperate with corresponding threads $T_M$ in the mounting units 3.

The shaft 4 is axially arrested in a housing 6, which can also constitute a gear, e.g. an angular gear. The mounting units 3 will move toward or away from each other, when the shaft 4 is rotated as they have opposed threads.

The beams or legs 7 which support the conveyor tracks are fixedly mounted on the mounting units 3 and the mutual position between the conveyor tracks thus will be changed when the mounting units 3 are displaced towards or away from each other.

In order to give the mounting units 3 desired accurate positions relative to each other, the housing 6 is preferably constituted by an angular gear or the like having a low gear ratio. The shaft 4 can be rotated via a gear in the housing 6 by means of a crank or the like but it is more convenient to provide an electromotor for this purpose. It is thus possible in a very simple manner to push an electric switch fop adjusting, via the mounting units 3, and the legs 7, the conveyor tracks to desired positions.

If an electromotor is used for the adjustment, it is also possible to make the adjustment fully automatic. It is then possible to provide some sort of sensor of the size of the objects, that shall be seized by the conveyor tracks, and via a transmitter emit a signal to the motor, which via a gear in the housing 6 adjusts the positions of the mounting units 3.

This is particularly convenient when small series of objects intended to be conveyed are transported and, therefore, frequent adjustments are required.

As earlier mentioned the conveyor tracks that shall be supported by the device according to the invention are generally so long that they must be mounted in several spaced apart positions.

If the positions of the tracks relative to each other shall be altered, it is necessary that such alteration be effected to the same extent at all supporting points. According to the invention, this can be obtained by a connection shaft 8 which projects from the housing 6, the shaft 8 being connected to an angular gear in a housing 6 in the following device and thereby driving the shaft 4 in this second device. A shaft 8 may also project from this device and drive the subsequent device. A simultaneous adjustment of all supporting devices is in this manner obtained from a common driving source in accordance with the invention.

Figure 2:
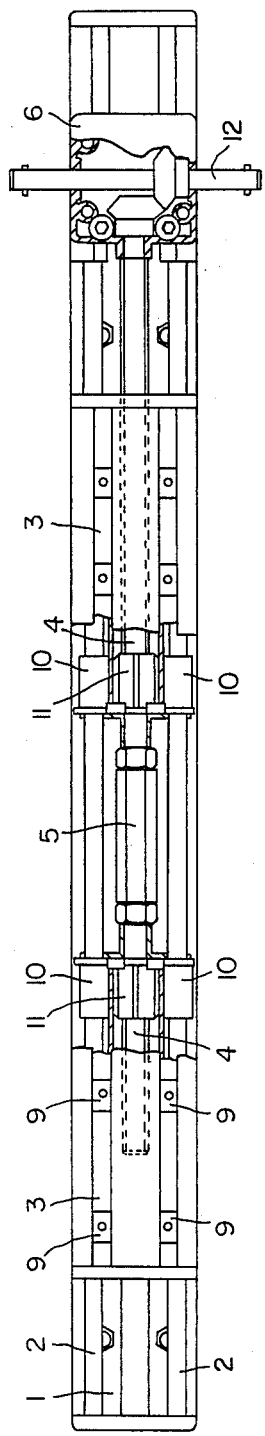
FIG. 2 shows partly in section the same device seen from above.

In FIG. 2 is shown the same device as that in FIG. 1 but seen from above.

The beam 1 is provided with guides 2 and mounting units 3. On these mounting units 3 are shown attachment points 9 for the legs 7, which shall support the conveyor tracks. Inside the mounting units 3 are fitted bushings 10 through which the guides 2 extend. The shaft 4 with threads extends through the nuts 11 fitted in the unit, which nuts have threads cooperating with the threads on the shaft 4. In the housing 6 is shown an angular gear which is driven via a shaft 12.

Figure 3:
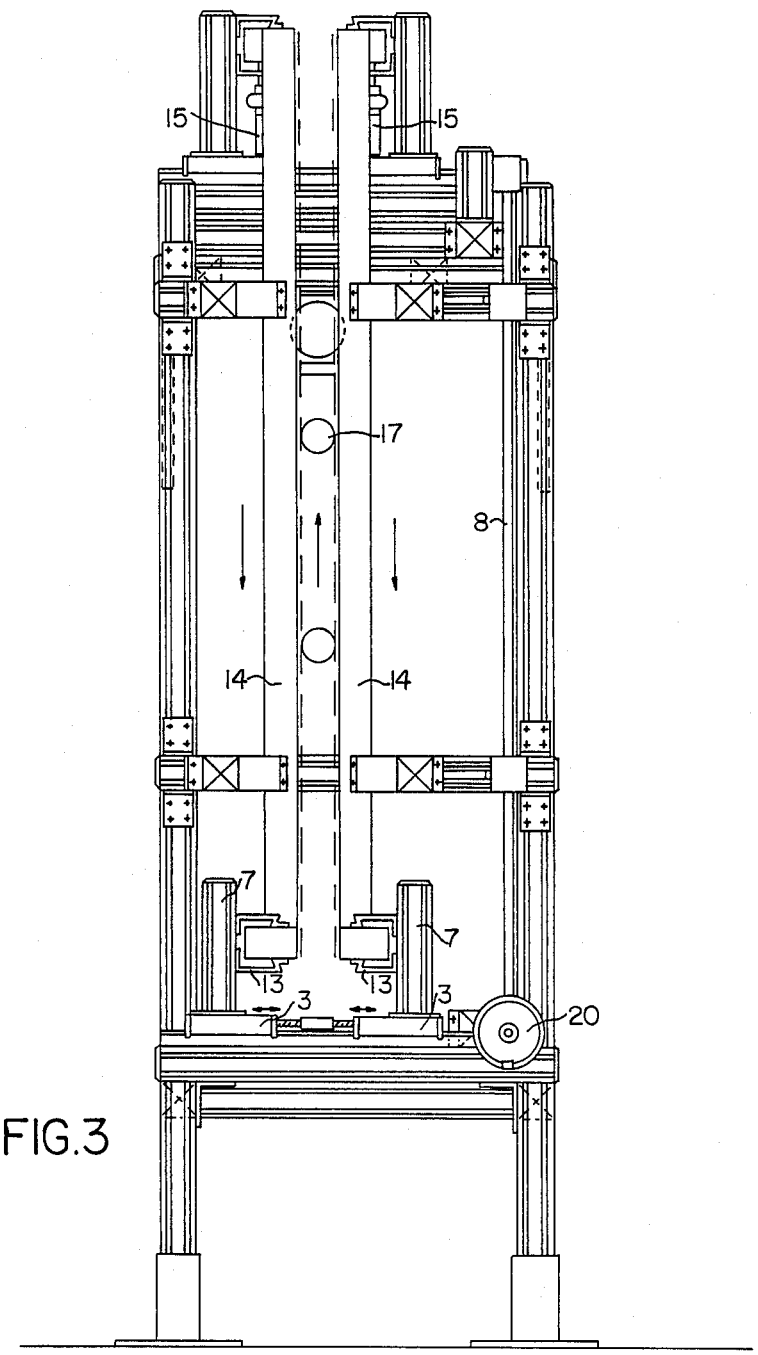
FIG. 3 shows from the front a conveyor track incorporating the devices according to the invention.
Figure 4:
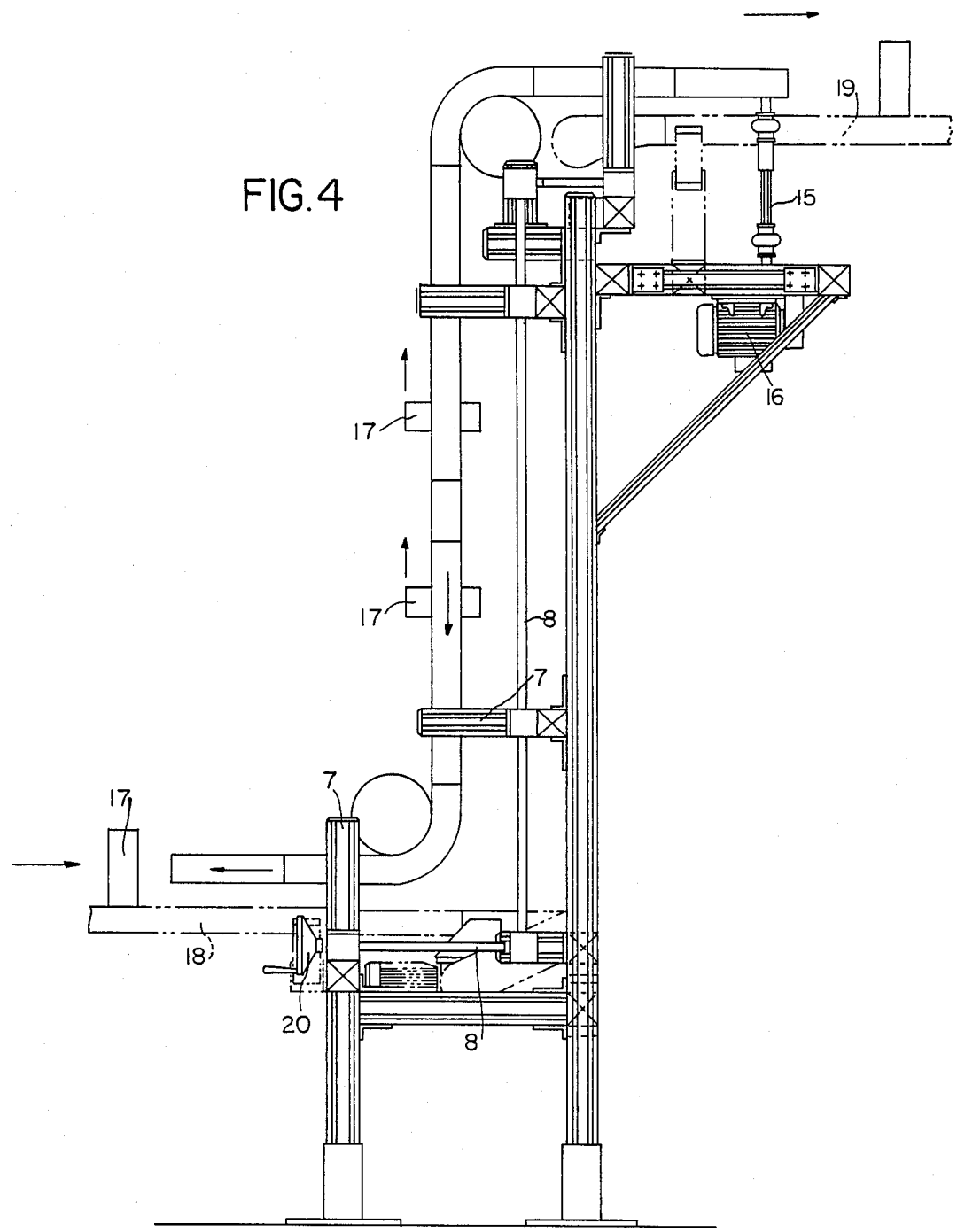
FIG. 4 shows the conveyor track according to FIG. 3 as seen from the side.
Figure 5:
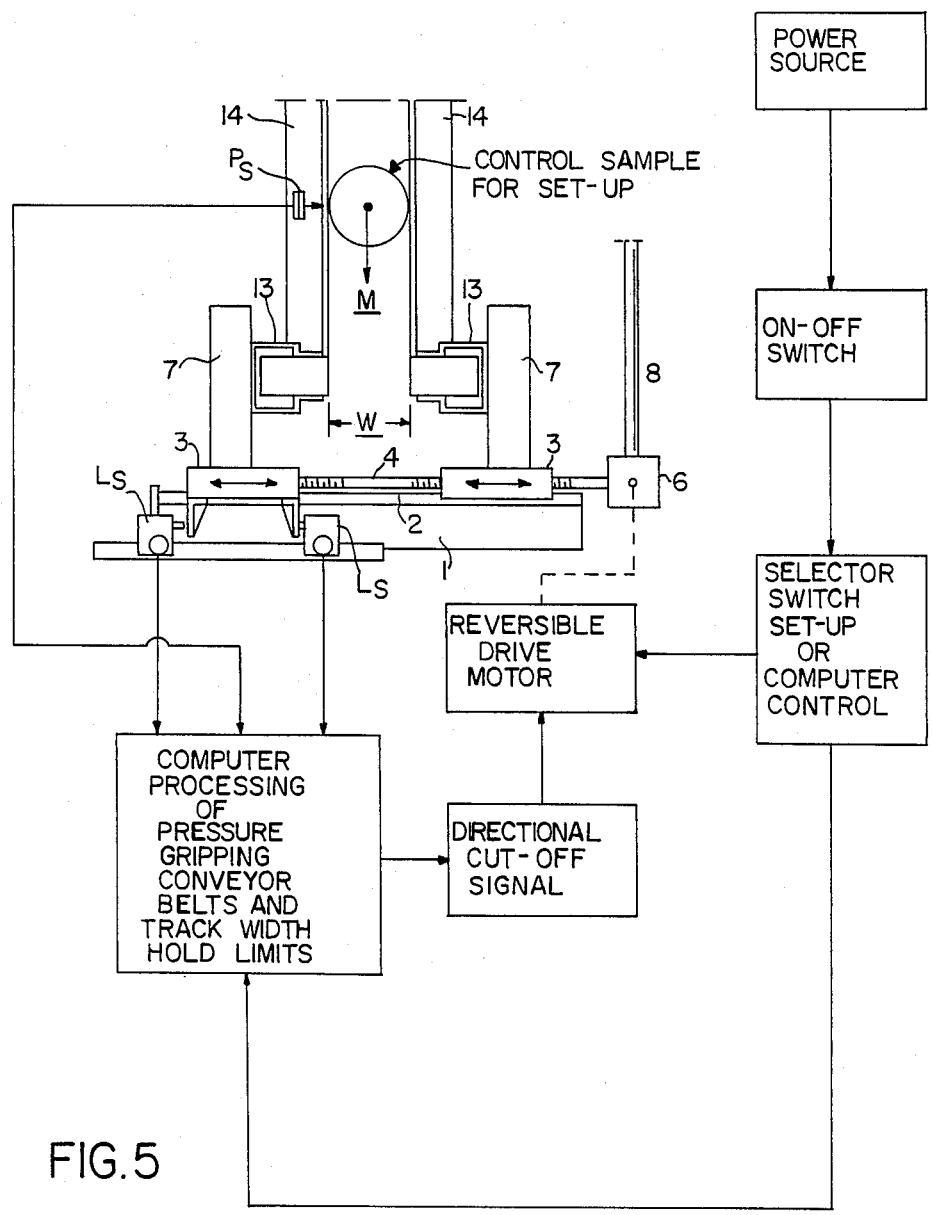
FIG. 5 is a schematic and diagrammatic representation of the devices shown in FIGS. 1–4 by utilizing an electro-motor computer system.

FIGS. 3 and 4 show in a front view and a side view respectively conveyor tracks mounted by means of the device according to the invention. The mounting units 3 support the legs 7, which in turn support mounting clamps 13, which clamp around the conveyor tracks 14. The conveyor tracks are driven via drive shafts 15 from an electric motor 16.

The objects 17 intended to be transported arrive to the conveyor tracks shown standing upon a conveyor track 18, and are seized by the conveyor tracks 14 and are delivered to the conveyor track 19.

As shown in FIGS. 3 and 4, it is, in the present case, used four mounting devices according to the invention. These are adjusted with aid of a crank 20, which, as mentioned above, preferably may be substituted for an electric motor with automatic adjustment possibilities.

The mounting devices according to the invention are interconnected by means of a connecting shaft 8. By the present invention is thus obtained a very convenient and simple suspension of conveyor tracks of the type in question.

As can be seen with reference to FIG. 4, the conveyor track assembly has at least two angularly offset run sections. At least one mounting assembly, consisting of two mounting units 3 and legs 7 to support the conveyor tracks, is located in each run section. Actuation means, defining a plurality of shaft segments 8 which are generally parallel to the run sections, is also provided. The shaft segments 8 are connected to one another via an angular gear located within the housing 6. The mounting assemblies are also interconnected by means of the shaft segments 8. Thus, by means of a crank 20, electric motor, or like device, simultaneous activation of all shaft segments 8 and mounting assemblies can be effectuated. In this way, spacing distance between the mounting assemblies can be varied.

The adjustment of the mutual relation between the tracks can be effected without stoppage and it can be made by unskilled personnel. Fully automatic adjustment may also occur.

The invention is not limited to the embodiment shown but can be varied in many different manners within the scope of the claims. It is thus possible that one of the mounting units 3 is disconnected from its threads, which means that only one of the conveyor tracks will move whereas the other one is stationary.

It is also possible to have more conveyor tracks mounted by means of the mounting units according to the invention, whereby these pairs stand beside each other and are served by common mounting devices. The pairs of conveyor tracks can be adjusted to the same or different mutual positions as desired.

What is claimed is:

1. A conveyor system comprising:
   elongated generally parallel movable tracks for conveying objects therebetween having at least two angularly offset run sections,
   means for selectively varying the distance between the tracks to accommodate objects of different sizes including a plurality of mounting assemblies cooperatively associated with the tracks,
   each mounting assembly including a pair of units connected by a shaft member rotatable in one direction to move the units away from one another to increase the distance between the tracks and in an opposite direction to move the units toward one another to decrease the distance between the tracks,
   at least one mounting assembly located in each run section and spaced along the length of the tracks,
   and actuation means defining a plurality of shaft segments generally parallel to the run sections and connected by angular gear means to effect simultaneous activation of all mounting assemblies.

* * * * *